United States Patent [19]

Draghici

[11] Patent Number: 6,101,757
[45] Date of Patent: Aug. 15, 2000

[54] FISH STRIKE INDICATOR

[76] Inventor: Arthur I. Draghici, 8733 Dennison, Detroit, Mich. 48210

[21] Appl. No.: 09/328,996

[22] Filed: Jun. 10, 1999

[51] Int. Cl.[7] .................................................. A01K 97/12
[52] U.S. Cl. ........................................................... 43/17
[58] Field of Search ............................................ 43/15–17

[56] References Cited

U.S. PATENT DOCUMENTS

| | | | |
|---|---|---|---|
| 2,133,880 | 10/1938 | Wallace et al. | 43/17 |
| 2,587,223 | 2/1952 | Robinson | 43/17 |
| 2,871,607 | 2/1959 | Carraway | 43/17 |
| 2,978,828 | 4/1961 | McQuiston et al. | 43/17 |
| 3,020,664 | 2/1962 | Snyder et al. | 43/17 |
| 3,027,675 | 4/1962 | Parsons | 43/17 |
| 3,798,630 | 3/1974 | Crosthwait | 43/17 |
| 4,202,126 | 5/1980 | Pietrenka | 43/17 |
| 4,376,349 | 3/1983 | Yarczower | 43/17 |
| 4,544,364 | 10/1985 | Bankston | 441/6 |
| 4,590,701 | 5/1986 | Rivers | 43/17 |
| 5,819,465 | 10/1998 | Bryant | 43/16 |
| 5,829,181 | 11/1998 | Fielder et al. | 43/17 |

FOREIGN PATENT DOCUMENTS

| | | |
|---|---|---|
| 463794 | 3/1950 | Canada . |
| 2067091 | 10/1993 | Canada . |
| 3832151 | 4/1990 | Germany . |
| 1327797 | 8/1973 | United Kingdom . |
| 1334557 | 10/1973 | United Kingdom . |
| 2240019 | 7/1991 | United Kingdom . |

OTHER PUBLICATIONS

"Rod–n–Bob's Rod and Bobber Beacons" *Cabela's Magazine*, date unknown, p. 120.

*Primary Examiner*—Michael J. Carone
*Assistant Examiner*—Son T. Nguyen

[57] ABSTRACT

A fish strike indicator for signaling that a fish is striking or biting when fishing in the dark. The fish strike indicator includes a housing. A resiliently deformable clip extends through the housing for clipping onto a fishing line. The clip has generally J-shaped ends positioned adjacent each other such that a channel is formed therebetween. A width of the channel is less than an outer diameter of the fishing line. The clip is electrically conductive. A light bulb is positioned in the housing and is in electrical communication with the clip. The clip is biased towards a bottom of the housing. A contact member is in electrical communication with a power source and is positioned above the clip such that movement of the fishing line pulls the clip into contact with the contact member thereby closing a circuit and permitting electricity to flow through the light bulb.

8 Claims, 3 Drawing Sheets

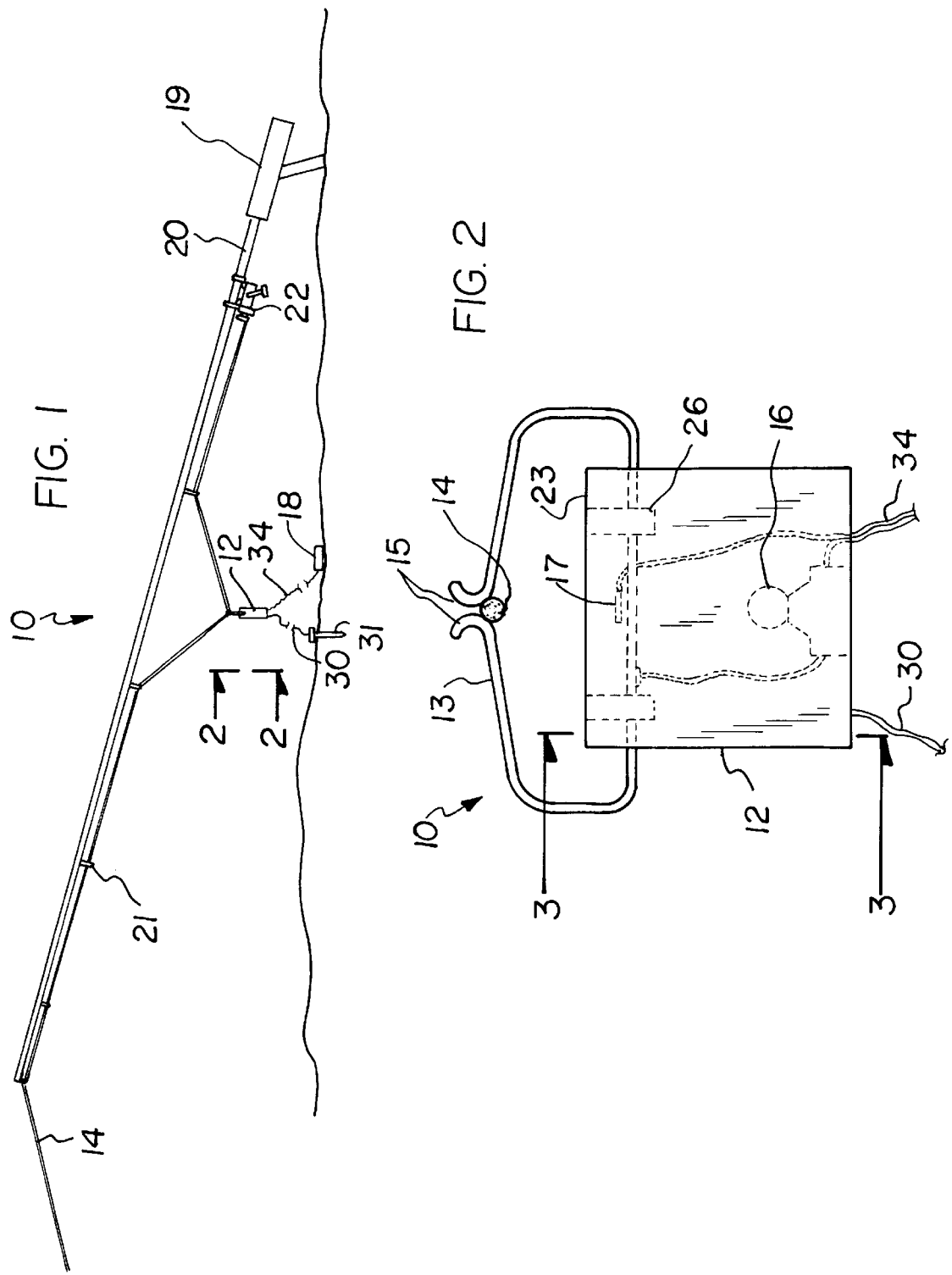

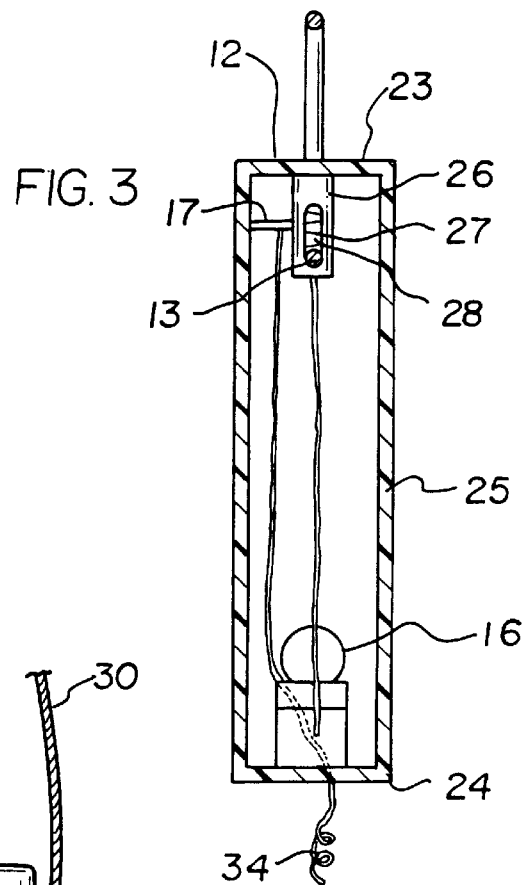
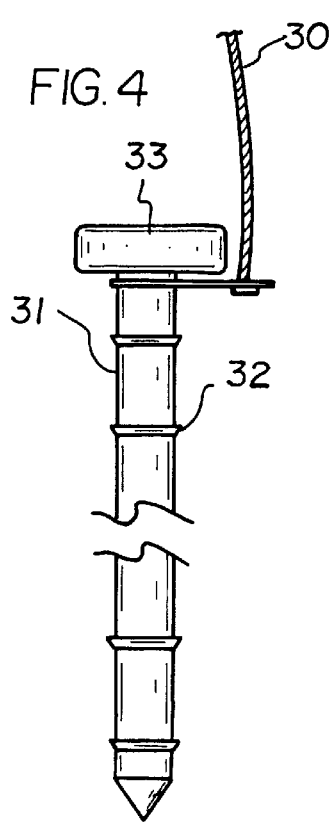
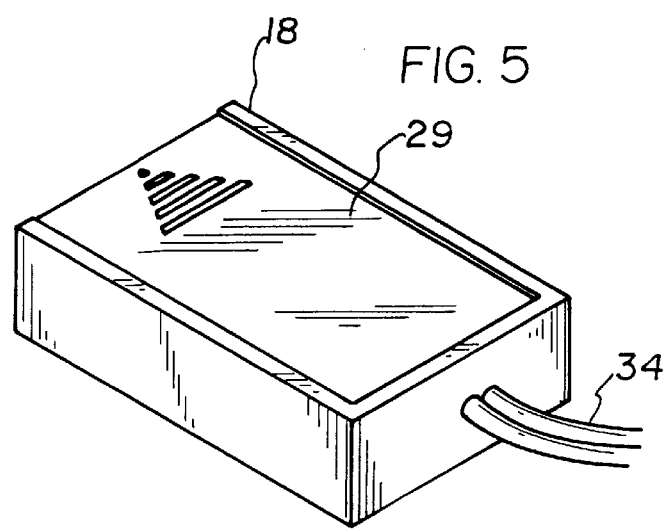

FISH STRIKE INDICATOR

BACKGROUND OF THE INVENTION

1. Field of the Invention

The present invention relates to fishing devices and more particularly pertains to a new fish strike indicator for signaling that a fish is striking or biting when fishing in the dark.

2. Description of the Prior Art

The use of fishing devices is known in the prior art. More specifically, fishing devices heretofore devised and utilized are known to consist basically of familiar, expected and obvious structural configurations, notwithstanding the myriad of designs encompassed by the crowded prior art which have been developed for the fulfillment of countless objectives and requirements.

Known prior art includes U.S. Pat. No. 4,125,957; U.S. Pat. No. 4,552,318; U.S. Pat. No. 5,077,928; U.S. Pat. No. 5,586,402; U.S. Pat. No. 4,702,031; and U.S. Pat. No. 373,171.

While these devices fulfill their respective, particular objectives and requirements, the aforementioned patents do not disclose a new fish strike indicator. The inventive device includes a housing. A resiliently deformable clip extends through the housing for clipping onto a fishing line. The clip has generally J-shaped ends positioned adjacent each other such that a channel is formed therebetween. A width of the channel is less than an outer diameter of the fishing line. The clip is electrically conductive. A light bulb is positioned in the housing and is in electrical communication with the clip. The clip is biased towards a bottom of the housing. A contact member is in electrical communication with a power source and is positioned above the clip such that movement of the fishing line pulls the clip into contact with the contact member thereby closing a circuit and permitting electricity to flow through the light bulb.

In these respects, the fish strike indicator according to the present invention substantially departs from the conventional concepts and designs of the prior art, and in so doing provides an apparatus primarily developed for the purpose of signaling that a fish is striking or biting when fishing in the dark.

SUMMARY OF THE INVENTION

In view of the foregoing disadvantages inherent in the known types of fishing devices now present in the prior art, the present invention provides a new fish strike indicator construction wherein the same can be utilized for signaling that a fish is striking or biting when fishing in the dark.

The general purpose of the present invention, which will be described subsequently in greater detail, is to provide a new fish strike indicator apparatus and method which has many of the advantages of the fishing devices mentioned heretofore and many novel features that result in a new fish strike indicator which is not anticipated, rendered obvious, suggested, or even implied by any of the prior art fishing devices, either alone or in any combination thereof.

Many times a fisherman lays a fishing rod down on the ground or places it in a rod holder, then watches the tip of the rod to see when a fish is biting. When a fish takes the bait and pulls the line, the tension on the line will cause the rod tip to bend or shake. When the fisherman sees the rod tip move, the fisherman knows that a fish has the bait and the rod should be picked up to set the hook. Unfortunately, it is difficult for a fisherman to see the rod tip at night. This results in many missed strikes where the fish senses the hook and releases the bait before the fisherman sees the tip move and can react. There is also the chance that a large fish will grab the bait and run with it, pulling the rod into the water before the fisherman sees the rod tip shaking. This results in the loss of an expensive rod and reel.

To make it easier to see a fishing rod at night, many fishermen use a flashlight, lantern, or other artificial light. This makes the rod more visible, but the light draws bugs and a large, bulky light is difficult for a fisherman to carry to his or her selected site. The present invention is designed to provide a lightweight, easy to use fishing accessory that would be clipped onto a fishing line to provide a visual indication when a fish strikes.

To attain this, the present invention generally comprises a housing. A resiliently deformable clip extends through the housing for clipping onto a fishing line. The clip has generally J-shaped ends positioned adjacent each other such that a channel is formed therebetween. A width of the channel is less than an outer diameter of the fishing line. The clip is electrically conductive. A light bulb is positioned in the housing and is in electrical communication with the clip. The clip is biased towards a bottom of the housing. A contact member is in electrical communication with a power source and is positioned above the clip such that movement of the fishing line pulls the clip into contact with the contact member thereby closing a circuit and permitting electricity to flow through the light bulb.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new fish strike indicator apparatus and method which has many of the advantages of the fishing devices mentioned heretofore and many novel features that result in a new fish strike indicator which is not anticipated, rendered obvious, suggested, or even implied by any of the prior art fishing devices, either alone or in any combination thereof.

It is another object of the present invention to provide a new fish strike indicator which may be easily and efficiently manufactured and marketed.

It is a further object of the present invention to provide a new fish strike indicator which is of a durable and reliable construction.

An even further object of the present invention is to provide a new fish strike indicator which is susceptible of a low cost of manufacture with regard to both materials and labor, and which accordingly is then susceptible of low prices of sale to the consuming public, thereby making such fish strike indicator economically available to the buying public.

Still yet another object of the present invention is to provide a new fish strike indicator which provides in the apparatuses and methods of the prior art some of the advantages thereof, while simultaneously overcoming some of the disadvantages normally associated therewith.

Still another object of the present invention is to provide a new fish strike indicator for signaling that a fish is striking or biting when fishing in the dark.

Yet another object of the present invention is to provide a new fish strike indicator which includes a housing. A resiliently deformable clip extends through the housing for clipping onto a fishing line. The clip has generally J-shaped ends positioned adjacent each other such that a channel is formed therebetween. A width of the channel is less than an outer diameter of the fishing line. The clip is electrically conductive. A light bulb is positioned in the housing and is in electrical communication with the clip. The clip is biased towards a bottom of the housing. A contact member is in electrical communication with a power source and is positioned above the clip such that movement of the fishing line pulls the clip into contact with the contact member thereby closing a circuit and permitting electricity to flow through the light bulb.

Still yet another object of the present invention is to provide a new fish strike indicator that is easy to quickly remove from the line so that the line may be reeled in.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be made to the accompanying drawings and descriptive matter in which there are illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 1 is a schematic side view of a new fish strike indicator according to the present invention.

FIG. 2 is a schematic side view of the present invention taken from line 2—2 of FIG. 1.

FIG. 3 is a schematic cross sectional view of the present invention taken from line 3—3 of FIG. 2.

FIG. 4 is a schematic side view of an anchor of the present invention.

FIG. 5 is a schematic perspective view of a battery box of the present invention.

DESCRIPTION OF THE PREFERRED EMBODIMENT

Figure 6:
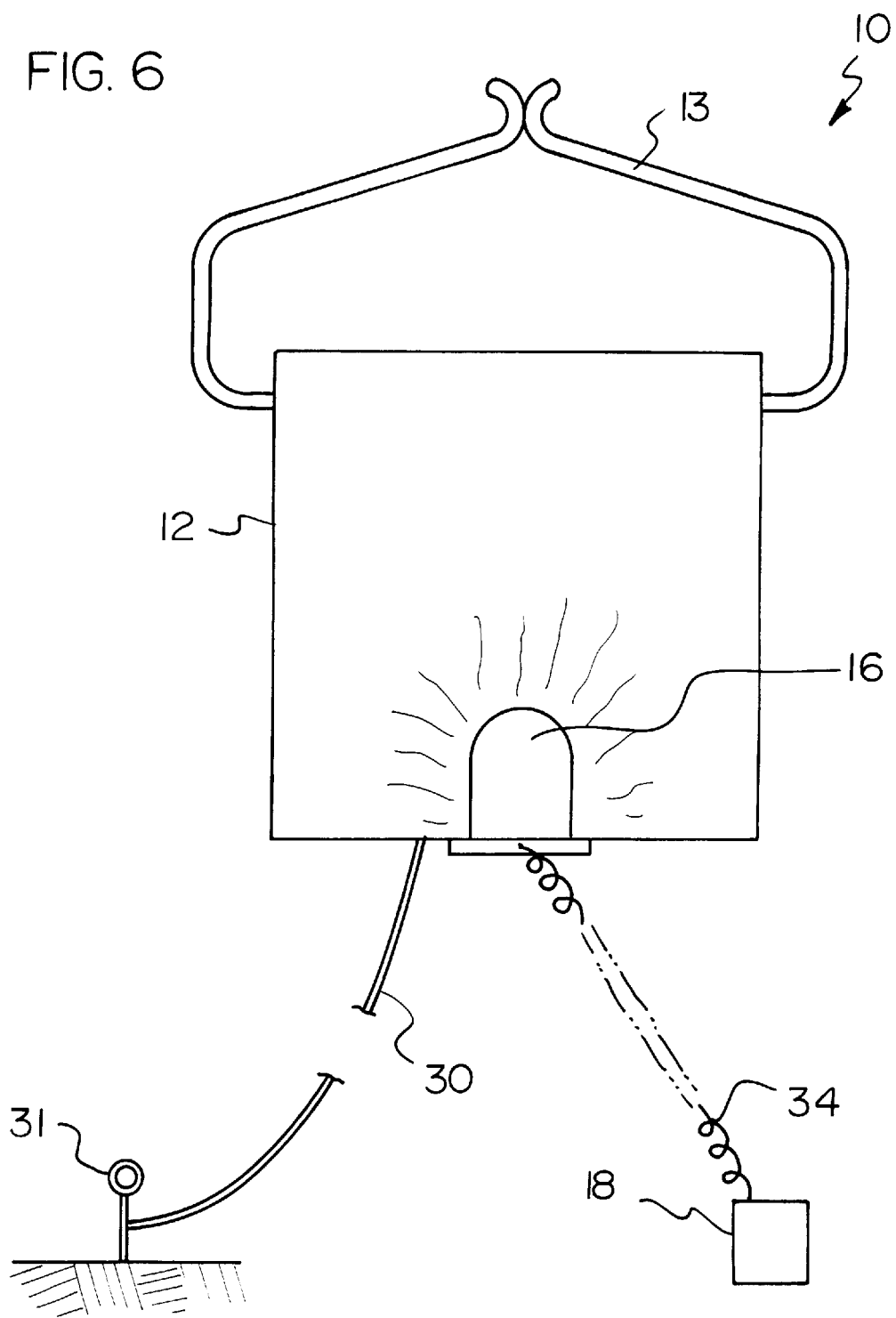
FIG. 6 is a schematic side view of a basic model of the fish strike indicator according to the present invention.

With reference now to the drawings, and in particular to FIGS. 1 through 6 thereof, a new fish strike indicator embodying the principles and concepts of the present invention and generally designated by the reference numeral 10 will be described.

As best illustrated in FIGS. 1 through 6, the fish strike indicator 10, in its most basic configuration, generally comprises a translucent housing 12. A resiliently deformable clip 13 extends through the housing for clipping onto a fishing line 14. The clip has curved, preferably generally J-shaped, ends 15 positioned adjacent each other such that a channel is formed between them. A width of the channel is less than an outer diameter of the fishing line so that the housing can be suspended from the line. A light bulb 16 is positioned in the housing and is in selective electrical communication with a power source 18.

In a more complex version of the fish strike indicator, the clip is electrically conductive. The light bulb is in electrical communication with the clip. The clip is biased towards a bottom of the housing. A contact member 17 is in electrical communication with the power source and is positioned above the clip such that movement of the fishing line pulls the clip into contact with the contact member thereby closing a circuit and permitting electricity to flow through the light bulb.

Also provided is rod holder 19. A fishing rod 20 is inserted in the rod holder. The fishing rod has a plurality of loops 21 coupled to is. A reel 22 is coupled to the rod and has a length of fishing line wrapped around a spool thereof. The fishing line extends through the loops of the rod.

The device includes a housing, preferably with a top 23, a bottom 24, and a translucent sidewall 25 that extends between the top and bottom and defines an interior of the housing. Alternative designs of the housing are spherical, cylindrical, and egg shaped, among others. Ideally, the housing is made completely from clear plastic. The preferred dimensions of the housing are about 1½ inches between the top and bottom by about 1½ inches between lateral sides of the housing by about ⅜ inches between front and back faces of the housing. The housing should weight no more than 10 grams.

Preferably, a pair of spring housings 26 are positioned in the housing. The clip extends through slots 27 of the spring housings. Each of the spring housings has a spring 28 therein. The springs bias the clip towards lower ends of the slots.

The contact member is in electrical communication with a power source and is positioned above the clip such that movement of said fishing line (such as from a bite or strike) pulls the clip into contact with the contact member thereby closing a circuit and permitting electricity to flow through said light bulb. Preferably, a coiled wire 34 extends from the contact member and the light bulb. The coiled wire should be at least one foot longer than the cord, discussed below. Ideally, the coiled wire is less than about 4 feet long.

Ideally, the power source comprises a battery. The battery is housed in a battery box 29.

Preferably, a cord 30 extends from the housing for anchoring the housing to a fixed object so that a user may merely grab the rod and start reeling. The cord will hold the housing such that the fishing line will pull out of the clip when sufficient force is exerted. The length of the cord should be three feet or less.

The cord is coupled to an anchor 31. The anchor is adapted for insertion in a ground surface. Ideally, the anchor is a stake, as shown in FIG. 4, with peripheral flanges 32 extending therefrom. Ideally, the flanges taper outwardly towards the head 33 of the stake.

In use, a fisherman casts and sets his or her line, places the rod in a holder, and attaches the clip to the line as shown in FIGS. 1 and 2. When a fish strikes, the line pulls the clip against the contact member, closing the circuit and lighting the bulb. The anchor cord prevents the housing from moving more than its tether allows, so when the fisherman picks up the rod and reel, the fishing line comes free from the clip, allowing the line to be reeled in without resistance.

As to a further discussion of the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. A fish strike indicating device being mountable to a fishing line for providing visual indication that a fish is striking bait coupled to the fishing line, the device comprising:

a housing, a resiliently deformable clip extending through said housing for clipping onto a fishing line, said clip having ends positioned adjacent each other such that a channel is formed therebetween, a width of said channel being less than an outer diameter of said fishing line; and a light bulb positioned in said housing and selectively in communication with a power source.

2. The device of claim 1, wherein said ends of said clip are generally J-shaped.

3. The device of claim 1, wherein said clip is electrically conductive, said light bulb being positioned in said housing and in electrical communication with said clip; said clip being biased towards a bottom of said housing, a contact member in electrical communication with said power source and positioned above said clip such that movement of said fishing line pulls said clip into contact with said contact member thereby closing a circuit and permitting electricity to flow through said light bulb.

4. The device of claim 3, further comprising a pair of spring housings positioned in said housing, said clip extending through slots of said spring housings, each of said spring housings having a spring therein, said springs biasing said clip towards lower ends of said slots.

5. The device of claim 1, wherein said power source comprises a battery, said battery being housed in a battery box.

6. The device of claim 1, further comprising a cord extending from said housing for anchoring said housing to a fixed object.

7. The device of claim 6, wherein said cord is coupled to an anchor, said anchor being adapted for insertion in a ground surface.

8. A night fishing system comprising, in combination:

a rod holder;

a fishing rod inserted in said rod holder, said fishing rod having a plurality of loops coupled thereto;

a reel coupled to said rod and having a length of fishing line wrapped around a spool thereof, said fishing line extending through said loops of said rod;

a fish strike indicating device for providing visual indication that a fish is striking bait coupled to said fishing line, said device comprising:

a housing having a top, a bottom, and a translucent sidewall extending between said top and bottom and defining an interior of said housing;

a resiliently deformable clip extending through said housing for clipping onto said fishing line, said clip having generally J-shaped ends positioned adjacent each other such that a channel is formed therebetween, a width of said channel being less than an outer diameter of said fishing line;

said clip being electrically conductive;

a light bulb positioned in said housing and in electrical communication with said clip;

a pair of spring housings positioned in said housing, said clip extending through slots of said spring housings, each of said spring housings having a spring therein, said springs biasing said clip towards lower ends of said slots;

a contact member in electrical communication with a power source and positioned above said clip such that movement of said fishing line pulls said clip into contact with said contact member thereby closing a circuit and permitting electricity to flow through said light bulb;

wherein said power source comprises a battery;

said battery being housed in a battery box;

a cord extending from said housing for anchoring said housing to a fixed object; and said cord being coupled to an anchor, said anchor being adapted for insertion in a ground surface.

* * * * *